Patented July 2, 1946

2,403,215

UNITED STATES PATENT OFFICE 2,403,215

RESINOUS COMPOSITIONS AND ELECTRICAL CONDUCTORS INSULATED THEREWITH

Harlan Foster, Wilmington, Del., assignor to E. I. du Pont de Nemours & Company, Wilmington, Del., a corporation of Delaware No Drawing. Application October 14, 1943, Serial No. 506,254

12 Claims. (Cl. 260—36)

This invention relates to new resinous compositions and more particularly to improved insulation for electrical conductors.

Vinyl chloride-vinyl acetate copolymers have been found to be very useful for insulating wires and cables. When properly plasticized and stabilized, these copolymer resins have good electrical properties and possess better chemical resistance and aging characteristics than rubber. Although vinyl chloride-fumaric ester copolymers match vinyl chloride-vinyl acetate copolymers in toughness, chemical resistance, and aging properties, they cannot be used generally for wire insulation because they are deficient in certain electrical properties particularly insulation resistance. Furthermore, the fumaric ester copolymers do not respond to the various types of stabilizers and fillers which have heretofore been used to improve the electrical properties of chlorine containing polymers. For example, litharge or lead carbonate have a very pronounced beneficial effect on the insulation resistance and power factor of plasticized polyvinyl chloride or plasticized vinyl chloride-vinyl acetate copolymer. These agents, however, have little or no corresponding effect on plasticized vinyl chloride-fumaric ester copolymers.

This invention has as an object the production of new and improved vinyl chloride-fumaric ester copolymer compositions. A further object is the preparation of compositions of this kind which possess valuable electrical insulating properties. A further object resides in methods for obtaining these compositions. A still further object is the manufacture of improved insulated electrical conductors in which the insulation comprises the above mentioned vinyl chloride-fumaric ester compositions.

The above object is accomplished by intimately mixing a vinyl chloride-fumaric ester copolymer with a plasticizer and with 1–25%, based on the copolymer, of a basic compound of a metal of groups IA or IIA of the periodic table.

The preferred basic compounds of this kind are those of group IIA and of these compounds the hydroxides of group IIA, such as calcium and barium hydroxide, are particularly effective. These compounds are added to the copolymer in amount based on the weight of the copolymer, of from at least 1.0%. In some instances amounts as much as 25% can be used but an amount in the neighborhood of 10% is sufficient to obtain optimum electrical properties and as the amount of the basic compound becomes substantially larger the pliability of the copolymer becomes poorer at low temperatures.

In the best method of practicing the invention the vinyl chloride-fumaric ester copolymer is pulverized and soaked in a small amount of acetone until it is thoroughly softened. A finely divided hydroxide, for example, calcium hydroxide, in amount of about 10% by weight of the copolymer, is added together with a plasticizer and the mixture is then compounded for 30 minutes at 130°–140° C. on heated rolls in order to bring about complete homogenization and remove the last traces of acetone.

If a large amount of plasticizer is used, it is not necessary to soften the powdered copolymer in acetone. Instead, the ingredients can be homogenized directly in any type of conventional mixing equipment at an elevated temperature, i. e., 100°–130° C. The amount of plasticizer will generally vary between 20 and 40% based on the copolymer, depending on the degree of flexibility and softness desired in the finished product. Any commercial grade of a plasticizer compatible with vinyl chloride-fumaric ester copolymers is suitable for preparing the products of this invention.

The material obtained by this method can be removed from the heated rolls in the form of sheets, ribbons or tapes which are tough, pliable over a wide temperature range and very resistant to oils and greases. Another outstanding characteristic of this material is the ease with which it can be extruded in the form of films, tubes or rods at temperatures in the neighborhood of 100°–130° C. For instance, extrusion over wire can be carried out with unusual ease at 120°–125° C. with the aid of a standard extrusion coating apparatus, such as the Royle Screw Stuffer (manufactured by John Royle & Sons, Paterson, New Jersey), to give a smooth attractive insulation. In order to impart maximum toughness to the coating applied in this fashion it is advantageous to preheat the uncoated wire to a temperature in the neighborhood of 200° C. and then immediately after leaving the extrusion head in which the wire is coated, pass it through a zone heated to 150°–300° C. In this manner an insulated wire is obtained which is resistant to heat checking when wound into a tight coil and heated for 1 hour at 125°–135° C. Wire insulated in this manner can also be bent sharply at temperatures as low as −40° C. without the insulation cracking.

The copolymers used in the practice of this invention are prepared by the conjoint polymerization of vinyl chloride and a fumaric ester. A method for obtaining these copolymers consists in heating the mixture to be polymerized, such as vinyl chloride plus diethyl or dimethyl fumarate, under pressure in the presence of an aqueous medium adjusted to a pH of about 2–4 by addition of acids or acid reacting salts and containing about 0.1% to 2.0% of a perdisulfate salt and about 1% to 5% of a dispersing agent of the acid stable type comprising an acyclic hydrocarbon of 12 to 18 carbon atoms substituted with one and only one nitrogen-free anionic solubilizing group. The polymerization is conducted by placing the mentioned aqueous medium in a pressure vessel provided with means for agitation such as stirring or shaking and adding to the aqueous medium about one half of its weight of the mixture of vinyl chloride and fumaric ester to be polymerized. The vessel is cooled below the boiling point of the monomeric vinyl chloride and the air in the free space of the vessel is displaced by an inert gas such as nitrogen. The vessel is then closed and heated thereafter at a constant temperature in the range of 20°–80° C. with constant or intermittent agitation until polymerization has proceeded to the desired extent.

In addition to the basic compounds previously described, it is often desirable to add various pigments to the plasticized vinyl chloride-fumaric ester copolymer in order to impart color to the composition. For example, a black stock may be obtained by adding, in addition to calcium hydroxide, various carbon blacks, such as "Bone Black," or "Micronex." Other pigments such as titanium oxide, etc., may also be added. When this is done, it is always advisable to thoroughly wash the pigments with water before incorporating them in the copolymer in order to remove any soluble electrolytes which might otherwise detract from the electrical properties of the final composition.

In many cases it is also desirable to add small amounts of stabilizers to the copolymer, which retard decomposition and thus improve its aging characteristics. Derivatives of propylene oxide are useful in this respect, particularly phenoxypropylene oxide.

The invention is further illustrated by the following examples in which the parts are by weight.

*Example I*

Seventeen and three-quarters parts (17.75) of a vinyl chloride-diethyl fumarate copolymer obtained by the conjoint polymerization of 5 parts of diethyl fumarate and 95 parts of vinyl chloride is mixed for 10 minutes in a Werner & Pfleiderer mixer heated by means of low pressure steam to 40°–60° C. with 3.5 parts of acetylated castor oil, 1.75 parts of di(butoxyethyl)-sebacate, 1.5 parts of powdered calcium hydroxide, 0.25 part of washed bone black, 0.25 part of phenoxypropylene oxide, and 9 parts of acetone. The colloided polymer is then removed from the mixer and worked on heated rolls for 20 minutes at 135° C. in order to remove the last traces of acetone. The plasticized copolymer obtained is eminently suited for electrical insulation by reason of its excellent physical toughness, water resistance, and pliability over a wide temperature range. It can also be processed with unusual ease with various types of extrusion equipment. A pressed film of this material has, at 20° C., a dielectric constant of 5.4, a power factor of .08 (1000 cycles/sec.) and its volume resistivity is $5.3 \times 10^{12}$ ohms-cm. These values are unaffected when the polymer is submerged in water for prolonged periods. By contrast, a film of the same copolymer containing no calcium hydroxide but containing similar amounts of the other ingredients listed in the above example has a volume resistivity of only $2 \times 10^{11}$ ohms-cm.

*Example II*

Example I is repeated with calcium carbonate substituted for calcium hydroxide. A pressed film of the plasticized copolymer obtained in this manner has a dielectric constant of 5.2, a power factor of .08, at 1000 cycles/sec. and a volume resistivity of $1 \times 10^{12}$ ohms-cm.

In the foregoing example if the calcium carbonate is replaced by an equal amount of lead carbonate or litharge, the volume resistivities of the resulting products are only of the order of $10^{10}$ to $10^{11}$ ohms-cm.

*Example III*

Twenty three and one-half (23.5) parts of a vinyl chloride-dimethyl fumarate copolymer obtained by the conjoint polymerization of 95 parts vinyl chloride and 5 parts of dimethyl fumarate is intimately mixed in a mechanical mixer at 45°–50° C. for 10–15 minutes with 5 parts of acetylated castor oil, 2.5 parts di-(butoxyethyl)-sebacate, 2 parts of barium hydroxide octa-hydrate, 0.3 part bone black and 0.3 part phenoxypropylene oxide and 12 parts of acetone. The colloided polymer is then removed from the mixer and worked on heated rolls for 20 minutes at 135° C. The plasticized polymer obtained has exceptionally good electrical properties as shown by the following values obtained at 20° C.: Power factor at 1000 cycles/sec. 0.06; dielectric constant 5; and volume resistivity $10^{14}$–$10^{15}$ ohms-cm.

*Example IV*

Example III is repeated with barium carbonate substituted for barium hydroxide. A pressed film of the plasticized copolymer obtained in this fashion has the following electrical characteristics at 20° C.: Power factor (1000 cycles/sec.) 0.07, dielectric constant 6, and volume resistivity $1 \times 10^{12}$ ohms-cm.

*Example V*

Example III is repeated with calcium hydroxide substituted for barium hydroxide. The electrical properties of the plasticized composition obtained are: Power factor at 1000 cycles/sec. 0.07–0.08, dielectric constant 6, volume resistivity $2.2 \times 10^{13}$ ohms-cm.

*Example VI*

Example III is repeated with sodium carbonate-monohydrate substituted for barium hydroxide. A composition is thus obtained having the following electrical properties at 20° C.: Power factor (1000 cycles/sec.) 0.07, dielectric constant 6, and volume resistivity $1 \times 10^{12}$ ohms-cm.

Other basic compounds of groups IA and IIA of the periodic system that can be used instead of those mentioned in the examples include such compounds as lithium carbonate, sodium carbonate, potassium carbonate, magnesium hydroxide, magnesium carbonate, magnesium oxide, and barium oxide. The following table shows the volume resistivity in ohms per centimeter of vinyl chloride-diethyl fumarate copolymer containing the basic compounds within the class disclosed herein, and also of compositions differing in that the basic compound is either omitted or replaced by one other than the kind used in the practice of this invention. The copolymer is plasticized with 20 parts of acetylated castor oil and 10 parts of di-(butoxyethyl)-sebacate per 100 parts of copolymer. In both the first and second columns of the table the figures refer to the parts of basic compound and of the coloring pigment present for each 100 parts of the plasticized copolymer.

Table

| Basic compound, per cent | Coloring pigment, per cent | Volume resistivity, ohms-cm. |
|---|---|---|
| Barium hydroxide 8H$_2$O (8.5) | Bone black (1.4) | 10$^{14}$–10$^{13}$ |
| Calcium hydroxide (8.5) | do | 5.3×10$^{12}$ |
| Calcium carbonate (8.5) | do | 1.1×10$^{12}$ |
| Litharge (13) | do | 3×10$^{11}$ |
| None | do | 2×10$^{11}$ |
| Do | "Micronex" (1.2) | 2×10$^{11}$ |
| Lead carbonate (4) | do | 1×10$^{10}$ |

The vinyl chloride-fumaric ester copolymers are preferably those containing at least 95% by weight of vinyl chloride, and for most purposes the copolymers composed by weight of 95% vinyl chloride and 5% fumaric ester are preferred. These proportions, however, can vary somewhat widely as for instance from a copolymer containing 99% vinyl chloride and 1% fumaric ester to one containing 75% vinyl chloride and 25% fumaric ester. Instead of the copolymers of vinyl chloride with dimethyl or diethyl fumarate, the copolymers, obtained with other fumaric esters can be used, as for example with dipropyl and dibutyl esters of fumaric acid and their homologs.

Various types of plasticizers may be used for preparing the compositions of this invention. For example, organic phosphates, such as tricresyl phosphate, trioctyl phosphate, triphenyl phosphate; esters of phthalic acid such as dioctyl phthalate, dicapryl phthalate; acetylated vegetable oils, such as acetylated castor oil; and alkoxyalkyl esters of organic carboxylic acids. These plasticizers may be used either alone or in any desired combination with one another. As a rule, plasticizers high in carbon and low in oxygen content, such as dioctyl phthalate or derivatives of ricinoleic esters impart the best electrical properties and water resistance to the copolymer, whereas the alkoxyalkyl esters impart best low temperature pliability. In general, the amount and type of plasticizer used will depend primarily on the combination of properties desired in the final composition. In most cases, an increase in the plasticizer content is reflected in a corresponding deterioration of the electrical properties of the copolymer.

Although it is usually preferable to mix the ingredients of the compositions herein described on heated rolls, any convenient type of mixing equipment, such as, for example, a Werner & Pfleiderer or Banbury mixer may be used. If desired, the copolymer, plasticizer, and stabilizing agent may be dissolved in a mutual solvent and the previously described compounds of groups IA and IIA and pigments can then be dispersed in this solution prior to or during the evaporation of the solvent. Very often it is advantageous to combine the various compounding techniques. For example, compounding by means of heated rolls is markedly accelerated if the copolymer is first of all allowed to soak in a small amount of solvent containing the plasticizer just long enough to soften but not long enough to dissolve. The balance between electrical and physical properties in the final composition is generally better if the pigments, stabilizers, plasticizers, and basic compounds are added simultaneously to the dry copolymers.

The compositions obtained through this invention are particularly useful for insulating all types of electric conductors, especially telephone and ordinary household wiring. They may also be used as condenser dielectrics. By reason of their excellent resistance to water, oils, greases, and ozone, their good aging characteristics, outstanding workability on various types of processing equipment, and the fact that they maintain their pliability and toughness over a wide temperature range, these compositions are well suited as protective jackets for all types of cables, i. e., power cables, submarine cables, telephone cables, etc. Apart from their particular value in the electrical industry, the compositions of this invention may also be used in the manufacture of coated fabrics, unsupported films, molded articles of all types, protective coatings, gaskets, abrasive compositions, adhesives, caps, closures, collapsible containers, storage battery plate separators, tapes, etc.

As many apparently widely different embodiments of this invention may be made without departing from the spirit and scope thereof, it is to be understood that I do not limit myself to the specific embodiments thereof except as defined in the appended claims.

I claim:

1. A composition of matter comprising the conjoint polymerization product of a mixture of vinyl chloride and a fumaric ester in the proportion by weight of said mixture of from 1% fumaric ester and 99% vinyl chloride to 25% fumaric ester and 75% vinyl chloride, a plasticizer for said polymerization product, and from 1% to 25%, based on the weight of said polymerization product, of an inorganic basic compound selected from the group consisting of alkaline earth oxides, alkaline earth hydroxides, alkaline earth carbonates, and alkali metal carbonates, said fumaric ester being slected from the group consisting of dimethyl fumarate and diethyl fumarate.

2. The composition set forth in claim 1 in which said fumarate is diethyl fumarate.

3. The composition set forth in claim 1 in which said fumarate is dimethyl fumarate.

4. The composition set forth in claim 1 in which said basic compound is calcium hydroxide.

5. The composition set forth in claim 1 in which said basic compound is barium hydroxide.

6. An insulated conductor the insulation of which comprises the conjoint polymerization product of a mixture of vinyl chloride and a fumaric ester in the proportion by weight of said mixture of from 1% furmaric ester and 99% vinyl chloride to 25% fumaric ester and 75% vinyl chloride, a plasticizer for said polymerization product, and from 1% to 25%, based on the weight of said polymerization product, of an inorganic basic compound selected from the group consisting of alkaline earth oxides, alkaline earth hydroxides, alkaline earth carbonates, and alkali metal carbonates, said fumaric ester being selected from the group consisting of dimethyl fumarate and diethyl fumarate.

7. An insulated conductor the insulation of which comprises the conjoint polymerization product of a mixture of vinyl chloride and a fumaric ester in the proportion by weight of said mixture of from 1% fumaric ester and 99% vinyl chloride to 25% fumaric ester and 75% vinyl chloride, a plasticizer comprising a mixture of an acetylated vegetable oil and an alkoxyalkyl ester of an organic carboxylic acid, and from 1% to 25%, based on the weight of said polymerization product, of an inorganic basic compound selected from the group consisting of alkaline earth oxides, alkaline earth hydroxides, alkaline earth carbonates, and alkali metal carbonates, said fumaric ester being selected from the group consisting of dimethyl fumarate and diethyl fumarate.

8. An insulated conductor the insulation of which comprises the conjoint polymerization product of a mixture of vinyl chloride and a fumaric ester in the proportion by weight of said mixture of from 1% fumaric ester and 99% vinyl chloride to 25% fumaric ester and 75% vinyl chloride, a plasticizer comprising a mixture of acetylated castor oil and di-(butoxyethyl)-sebacate, and from 1% to 25%, based on the weight of said polymerization product, of an inorganic basic compound selected from the group consisting of alkaline earth oxides, alkaline earth hydroxides, alkaline earth carbonates, and alkali metal carbonates, said fumaric ester being selected from the group consisting of dimethyl fumarate and diethyl fumarate.

9. The insulated electrical conductor set forth in claim 6 in which said fumarate is diethyl fumarate.

10. The insulated electrical conductor set forth in claim 6 in which said fumarate is dimethyl fumarate.

11. The insulated electrical conductor set forth in claim 6 in which said basic compound is calcium hydroxide.

12. The insulated electrical conductor set forth in claim 6 in which said basic compound is barium hydroxide.

HARLAN FOSTER.